June 5, 1956     R. H. GOODRICH ET AL     2,749,101

MINING AUGER DRILL HEAD

Filed Feb. 5, 1953

INVENTORS:
Ross H. Goodrich
Walter L. Shoulders

BY    *Louis A. Maxson*

ATTORNEY

United States Patent Office 2,749,101
Patented June 5, 1956

2,749,101

MINING AUGER DRILL HEAD

Ross H. Goodrich, Claremont, N. H., and Walter L. Shoulders, Cleveland Heights, Ohio, assignors to Joy Manufacturing Company, Pittsburgh, Pa., a corporation of Pennsylvania Application February 5, 1953, Serial No. 335,234

7 Claims. (Cl. 262—7)

This invention relates to auger drill heads, and particularly to large auger drill heads which are adapted to be arranged at the forward end of driving and helical conveying means for the purpose of forming relatively large openings in mineral veins, either for the purpose of forming tunnels or bores, or for mining material which because of the thinness of the seams is best mined by such devices.

Auger drill heads comprising a rotatable and advanceable head in the form of a relatively long cylinder armed with cutters at its forward end and having coaxial with it, and of smaller overall diameter than the inside diameter of such cylinder, a breaker, such cylinder and breaker arranged at the forward end of a driving and conveying screw, are known to the art. The cylinders of these auger drill heads are relatively long, and the space between the cylinder and the breaker frequently becomes choked with material. They are, moreover, heavy.

The use of a ring to support cutting elements provides for a larger number and a more widespread distribution of such elements than is practicable by an arrangement of cutting elements only on the ends of helical flanges or wings which extend forwardly from in adjacency to the helical conveyor.

A desirable embodiment of the invention may comprise a ring of appropriate diameter and suitable radial thickness and of comparatively short axial dimension, said ring armed with a number of cutting bits, preferably more or less uniformly spaced about its circumference and in an arrangement which cuts a circular groove into which the ring may be advanced. Preferably the bit-armed ring is formed directly at the end of helical flanges which may be in effect extensions or continuations of the helices of a helical conveyor. The helical flanges may all project outwardly from a central hublike portion or base which may be provided with a spud portion to be received in a socket at the forward end of a helical conveyor and drive element. The base or support to which the flanges or wings are connected at their ends remote from the ring may comprise in addition to the spud a central body carrying at its forward end the pilot hole-forming bit structure and the breaker. As a breaker there may be used a frusto-conical projection from the base or support, provided with spiral flutes with spaces between them for receiving material drilled out by a set of pilot hole-cutting bits which are supported by the breaker and adapted to cut a hole of adequate diameter to admit the small end of the frusto-conical breaker. The breaker may be disposed with its forward end forward of, rearward of, or in the same transverse planes as the front of the ring. It will be appreciated that as such an auger drill head is rotated and advanced, the bits on the ring cut an annular kerf, the pilot hole-cutting bits cut a coaxial bore, the breaker expands and breaks the annular core of material between the central hole and the annular kerf, and the helical flanges move—plow—the broken material along the wall of the bore of the hole and cause it to move in the grooves 16 between the flanges or wings 6 and so into the field of action of the helical conveyor. The forward ends of the wings may desirably be cut back inwardly from their junctions with the ring, and the helical ribs on the breaker will extend at the larger end of the breaker into the annular space provided by the cutting back of the wings. The helical ribs may have their rearward ends intermediate the wings, or be in effect low extensions of the latter.

An object of the invention is to provide an improved auger drill head. Another object of the invention is to provide an improved auger drill head which is comparatively light, possesses the necessary strength and rigidity, and is adapted to insure in an improved manner the avoidance of clogging of the drill head. Other objects and advantages will hereinafter appear.

In the accompanying drawing, in which one illustrative embodiment of the invention is shown, Fig. 1 is a side elevational view of an illustrative embodiment of our improved auger drill head.

Figure 1:
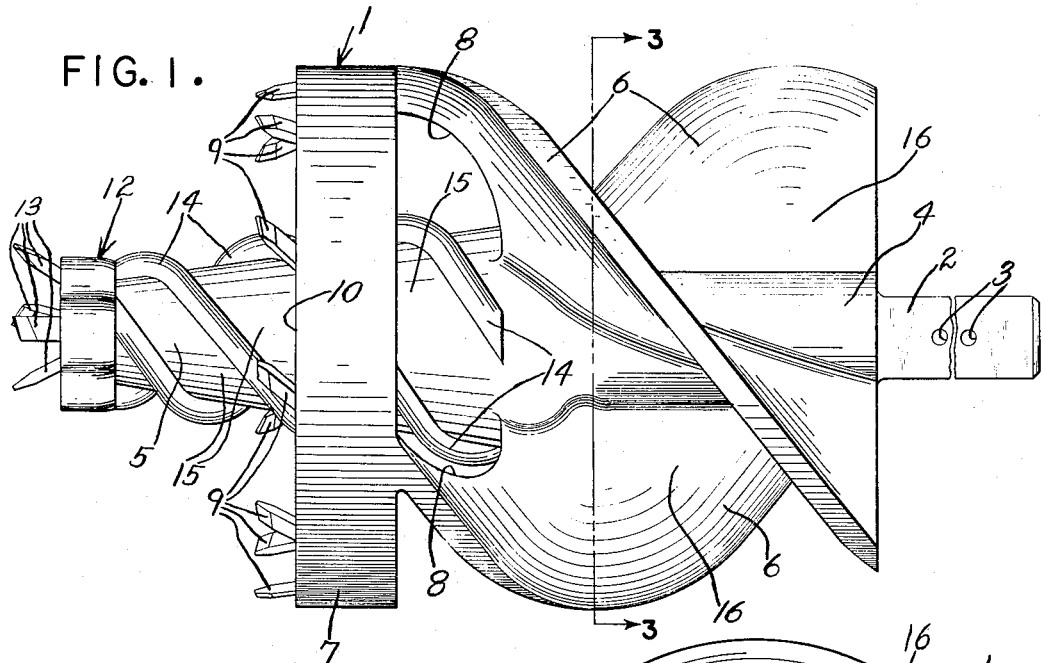
Figure 3:
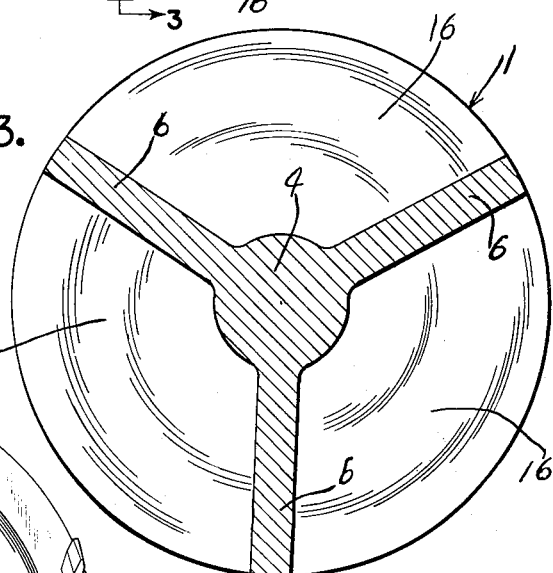
Fig. 3 is a transverse section on the plane of the line 3—3 of Fig. 1.
Figure 2:
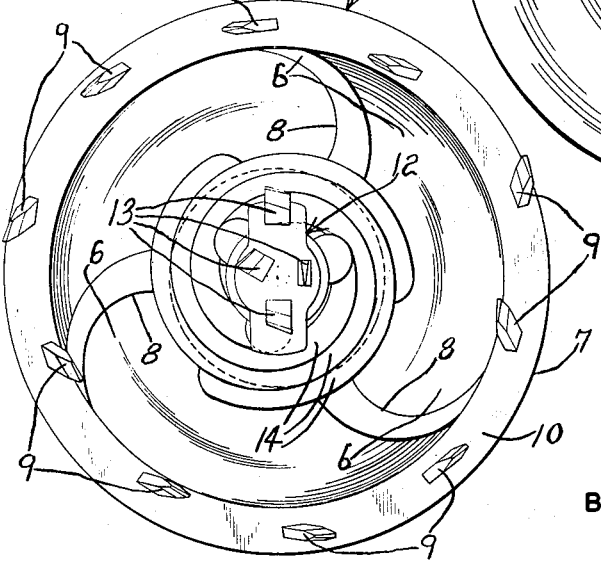
Fig. 2 is a front end view of the auger drill head of Fig. 1.

Referring to the drawing, an auger drill head generally designated 1 is adapted to be mounted at the forward end of a usual drive shaft (not shown) with which is associated a conveyor helix (also not shown), the auger head having, as shown in Fig. 1, a square spud portion 2 which is adapted to enter a correspondingly shaped socket in the drive shaft and to be held in the socket by one or more cross pins extending through transverse openings 3. Forwardly of the spud, there is a hub portion 4 which is shown as cylindrical for a substantial portion of its length, and which tapers at its forward end as at 5 from a portion of somewhat greater diameter than the cylindrical portion to a substantially smaller diameter. The hub portion 4 supports a plurality of spirally disposed wings 6. As shown, there are three of these wings arranged at angles of about 120° to each other. Each of the wings extends from the hub out substantially at least to the full desired circle of the hole to be formed by the auger drill head. It might be said that the wings are arranged, as shown, in the form of a triple thread. At their forward ends, the wings are connected to an annulus or ring 7. They are cut away rearwardly and inwardly from their attachments to ring 7 for a substantial distance as shown at 8. The annulus 7 is provided (or armed) at its forward face with material-attacking elements 9 disposed, as shown, with equal circumferential spacing about the forward face 10 of the annulus in such a pattern as to remove all of the material over an annular area slightly wider than the ring, so that the ring may enter without difficulty the annular groove which is formed. The forward faces of the wings are disposed in such relation to the annulus that they are not called upon to do any drilling, and the mineral (coal, or other suitable material) attacked by the auger will be broken up before the front ends of the wings 6 would commence to engage solid coal.

For the purpose of breaking the core of material which lies inwardly of the annular groove, there is provided at the forward end of the hub 4, and upon the tapered portion of the latter, an arrangement which now will be described. A drill head generally designated 12 is mounted on the forward end of the tapered portion 5, and is provided with drilling elements 13 in a suitable pattern. Helically arranged projections or ribs 14, of such height and so spaced apart as to provide channels 15 of adequate area to carry away all of the material cut by the head 12, are disposed upon the tapered portion 5, and extend back, through the ring and into the space provided by the cutting away of the forward ends of the wings 6. These projections enter the hole formed by the drilling head and break the material outwardly, the arrangement being such that the annular core of coal left between the center opening and the annular groove previously mentioned, will be fractured before the forward surfaces of the wings 6 would have a chance to engage the solid coal.

It will be evident that this arrangement will form a central hole somewhat ahead of the annular groove cut by the elements 9, that the forward ends of the projections or ribs 14 will enter this opening, and that, because of their expanding helix, they will slightly exceed the diameter of the hole cut at such a point along their length that as soon as the annular groove has been formed to a sufficient depth to provide clearance towards which the material may be broken, the material between the annular groove and the breaker will be broken loose and up into lumps and pieces of handable size. This material will pass into the wide grooves indicated at 16 between the wings 6 and, because of the helical disposition of these wings, the material will be moved readily back towards the main helical conveyor and be delivered past the rearward ends of the wings 6 to that conveyor. The disposition of the wings 6 may desirably be such that the wings on the drive and conveyor helix (not shown) will be in effect extensions of the wings 6.

It will be evident that the material will be broken loose from the face and transferred to the conveyor without any chance whatever of plugging the auger drill head, the helically disposed forward faces of the wings 6 wedging the material backwardly as it is broken from the solid, and the frictional engagement of the material with the bore of the hole causing the sloping faces of the wings to push the material rearward. The helical ribs 14 are shown as substantially midway of the spaces or grooves 15 between the wings 6.

From the foregoing description, it will be clear that the invention is adapted to provide for rapid and efficient formation of a hole of substantial size and for the removal of material as rapidly as it is detached from the solid—both the material drilled away and the material of the annular core between the central hole and the annular groove—without any possibility of plugging of the device, because there is assured relative rotation between the auger drill head and the surface contacted by the material at all times when the drilling operation is in progress.

While there is in this application specifically described one form which the invention may assume in practice, it will be understood that this form of the same is shown for purposes of illustration, and that the invention may be modified and embodied in various other forms without departing from its spirit or the scope of the appended claims.

What we claim is:

1. A rotatable auger drill head adapted for attachment to and rotation by a helical conveyor line, said auger drill head including at the forward end thereof a ring, material attacking elements carried by said ring for forming an annular groove in which said ring is receivable, a hub extending rearwardly behind said ring and adapted for connection to a helical conveyor line, drilling and breaking means coaxial with said ring and carried by and at the forward end of said hub, and means extending between said ring and the helical conveyor line for moving the material detached and disintegrated by said auger drill head along the wall of the hole formed by the extension of the outer wall of the annular groove including a plurality of helically disposed wings carried by said hub and having their inner edges connected to said hub throughout the major portions of their respective lengths and having their forward faces, in terms of direction of rotation, acting as pushers for disintegrated material, said wings at their outer forward portions connected to said ring and constituting the supporting means for the latter and having their forward faces cut back inwardly to form an annular space surrounding said hub, and said breaking means extending rearwardly of said head into said annular space.

2. A rotatable auger drill head adapted for attachment to and rotation by a helical conveyor line, said auger drill head including a central hub and a ring, material-attacking elements carried by said ring for forming an annular groove in which said ring is receivable, drilling means and breaking means coaxial with said ring and carried by said hub, said breaking means tapering forwardly from an enlarged rearward end to the rear of said ring and of greater diameter than said hub, and means extending between said ring and the helical conveyor line for moving the material detached and disintegrated by said auger drill head along the wall of the hole formed by the extension of the outer wall of the annular groove including a plurality of helically disposed wings carried by said hub and having their inner edges connected to said hub throughout the major portions of their respective lengths and having their forward faces, in terms of direction of rotation, acting as pushers for disintegrated material, said wings at their outer forward portions connected to said ring and having their forward faces cut inwardly to leave an annular space rearward of the ring and surrounding said hub and said breaking means having its larger end extending rearwardly of said head into said annular space.

3. A rotatable auger drill head adapted for attachment to and rotation by a helical conveyor line, said auger drill head including at the forward end thereof a ring, material-attacking elements carried by said ring for forming an annular groove in which said ring is receivable, drilling and breaking means coaxial with said ring, and means extending between said ring and the helical conveyor line for moving the material detached and disintegrated by said auger drill head along the wall of the hole formed by the extension of the outer wall of the annular groove including a plurality of common-hub-supported helically disposed wings having their forward faces, in terms of direction of rotation, acting as pushers for disintegrated material and their outer surfaces in a common cylindrical surface with the outer surface of said ring and having their inner edges connected to said hub throughout the major portions of their respective lengths, said wings at their outer forward portions connected to said ring and having their forward ends cut back inwardly and said breaking means extending rearwardly of said head into longitudinally overlapping relation with the forward ends of said wings.

4. A rotatable auger drill head adapted for attachment to and rotation by a helical conveyor line, said auger drill head including a hub portion having at the rearward end thereof means for attaching it to a helical conveyor line, at its forward end means for forming a circular opening, and to the rear of said means for forming a circular opening an expanding material conveying and breaking means, an annular-opening-cutting, a material-attacking-element-equipped ring surrounding said expanding material conveying and breaking means, and a plurality of helical wings attached directly to said hub portion at their inner sides at points all of which are spaced longitudinally rearwardly from said ring and having forward portions tapering forwardly and outwardly from said hub portion to a thickness less than the radial dimension of the annular opening cut by said material-attacking elements and attached at their forward ends to said ring, said material conveying and breaking means disposed with its larger end overlapped longitudinally by the forward ends of said wings.

5. A rotatable auger drill head adapted for attachment to and rotation by a helical conveyor line, said auger drill head including a hub portion having at the rearward end thereof means for attaching it to a helical conveyor line, at its forward end means for forming a circular opening, and to the rear of said means for forming a circular opening an expanding material conveying and breaking means, an annular-opening-cutting, material-attacking-element-equipped ring sourrounding said expanding material conveying and breaking means, and a plurality of helical wings attached directly to said hub portion at their inner sides at points all of which are spaced longitudinally rearwardly from said ring and having forward portions tapering forwardly and outwardly from said hub portion to a thickness less than the radial dimension of the annular opening cut by said material-attacking elements and attached at their forward ends to said ring, said material conveying and breaking means disposed with its larger end overlapped longitudinally by the forward ends of the hub-attached inner sides of said plurality of helical wings.

6. A rotatable auger drill head adapted for attachment to and rotation by a helical conveyor line, said auger drill head including a hub portion having at the rearward end thereof means for attaching it to a helical conveyor line, at its forward end means for forming a circular opening, and to the rear of said means for forming a circular an expanding material conveying and breaking means, an annular-opening-cutting, material-attacking-element-equipped ring surrounding said expanding material conveying and breaking means, and a plurality of helical wings attached directly to said hub portion at their inner sides at points all of which are spaced longitudinally rearwardly from said ring and having forward portions tapering forwardly and outwardly from said hub portion to a thickness less than the radial dimension of the annular opening cut by said material-attacking elements and attached at their forward ends to said ring, the forwardmost points of attachment of the inner sides of said helical wings to said hub portion and the larger end of said material conveying and breaking means each being closely adjacent to a given plane perpendicular to the axis of said hub portion.

7. A rotatable auger drill head adapted for attachment to and rotation by a helical conveyor line, said auger drill head including at the forward end thereof a ring, material-attacking elements carried by said ring for forming an annular groove in which said ring is receivable, a hub portion, drilling means and breaking means carried by said hub portion and coaxial with said ring, and means extending between said ring and the helical conveyor line for moving the material detached and disintegrated by said auger drill head along the wall of the hole formed by the extension of the outer wall of the annular groove including a plurality of helically disposed wings carried by said hub and attached, throughout the major portions of their lengths, at their inner edges to it and at their outer edges to said ring and having their forward faces, in terms of direction of rotation, acting as pushers for disintegrated material, said wings having their rearward portions extending out to a surface of revolution of the diameter of the outer periphery of said ring and being at their forward portions cut away between said ring and hub so that there remain at their outer edges reduced portions secured to said ring and adapted to enter said annular groove cut by said material-attacking elements, and said breaking means having its rearward end received within the space surrounded by the path of said reduced portions of said wings as the latter rotate.

References Cited in the file of this patent
UNITED STATES PATENTS

| | | |
|---|---|---|
| 632,764 | Stephens | Sept. 12, 1899 |
| 1,445,085 | Joy | Feb. 13, 1923 |
| 2,425,132 | Stokes | Aug. 5, 1947 |
| 2,562,841 | Compton | July 31, 1951 |
| 2,594,256 | Compton | Apr. 22, 1952 |
| 2,616,677 | Compton | Nov. 4, 1952 |